United States Patent [19]

Dockter et al.

[11] Patent Number: 5,640,608

[45] Date of Patent: Jun. 17, 1997

[54] SYSTEM AND METHOD FOR BLOCK GENERATION OF MONOTONIC GLOBALLY UNIQUE TAG VALUES, WHERE RESTART TAG VALUE DUE TO FAILURE STARTS AT HIGHEST VALUE OF PREVIOUSLY GENERATED TAG VALUES

[75] Inventors: Michael Jon Dockter, Hollister; Joel Frank Farber; Michael Leon Pauser, both of San Jose, all of Calif.; Kevin Darrell Seppi, Austin, Tex.; David Wayne Tolleson, San Jose, Calif.

[73] Assignee: International Business Machines Corporation, Armonk, N.Y.

[21] Appl. No.: 405,004

[22] Filed: Mar. 16, 1995

Related U.S. Application Data

[63] Continuation of Ser. No. 174,689, Dec. 28, 1993, abandoned.

[51] Int. Cl.$^6$ ............................................. G06F 19/00
[52] U.S. Cl. ............................................. 395/899
[58] Field of Search .......................... 395/375, 700, 395/650, 899

[56] References Cited

U.S. PATENT DOCUMENTS

| | | | |
|---|---|---|---|
| 4,855,906 | 8/1989 | Burke . | |
| 4,866,769 | 9/1989 | Karp | 380/4 |
| 4,958,278 | 9/1990 | Meguro . | |
| 5,117,351 | 5/1992 | Miller | 395/650 |
| 5,126,889 | 6/1992 | Walden | 360/53 |
| 5,133,060 | 7/1992 | Weber et al. . | |
| 5,187,790 | 2/1993 | East et al. | 395/650 |
| 5,204,897 | 4/1993 | Wyman | 380/25 |
| 5,313,628 | 5/1994 | Mendelsohn et al. | 395/575 |
| 5,528,759 | 6/1996 | Moore | 395/200.11 |

FOREIGN PATENT DOCUMENTS

| | | |
|---|---|---|
| 0509648A1 | 12/1992 | European Pat. Off. . |
| 0592045 | 4/1994 | European Pat. Off. . |

*Primary Examiner*—Richard L. Ellis
*Assistant Examiner*—Gautam R. Patel
*Attorney, Agent, or Firm*—Ohlandt, Greeley, Ruggiero & Perle

[57] ABSTRACT

A tag server system provides unique tag values to many client systems. The tag server system comprises a processor that generates an inventory of unique tag values, such values being generated by monotonically increasing a value within the tag body field. A memory is provided for storing the inventory of unique tag values. A nonvolatile memory is controlled by the processor and stores a highest unique tag value generated by the processor. The processor implements a tag value recovery procedure and is responsive to a data loss failure mode in the tag server system to cause a readout of the highest unique tag value from the non-volatile memory. The processor is responsive to that highest unique tag value to commence generation of new unique tag values monotonically from that value and expends no effort to regenerate lost unique tag values that are less than the highest unique tag value derived from the non-volatile memory.

17 Claims, 2 Drawing Sheets

SYSTEM AND METHOD FOR BLOCK GENERATION OF MONOTONIC GLOBALLY UNIQUE TAG VALUES, WHERE RESTART TAG VALUE DUE TO FAILURE STARTS AT HIGHEST VALUE OF PREVIOUSLY GENERATED TAG VALUES

This is a continuation of application Ser. No. 08/174,689 filed on Dec. 28, 1993, now abandoned.

FIELD OF THE INVENTION

This invention relates to computerized systems for generation of tag values that are used to identify data items and, more particularly, to a computerized tag server and method that operate to assure rapid availability of globally unique tag values.

BACKGROUND OF THE INVENTION

As distributed computing increases, tag servers are required to provide universally unique tags. Such tags (or "tokens") are employed to identify objects, events, geographic locations, etc. and are used in computer systems that are interconnected on a worldwide basis. Prior approaches for generating tags have tended to be single purpose i.e., telephone numbers (for telephones only); Library of Congress numbers (for documents only); social security numbers (limited to citizens of one country); etc.

Some prior approaches have used time or location as the basis for generation of unique tag values. However, clocks have synchronization, granularity, time zone and other problems; and nodes at locations can be moved, multiple servers can exist at one location, etc. In some prior approaches, fixed length fields were allocated to tag values. The fixed lengths prevented the tag values from being sufficiently extensible to take care of future requirements. Other approaches have used serial algorithms that: were unable to support parallel assignments or to respond to parallel, concurrent requests for tag assignments. Still other approaches required continued communication between tag generation systems to assure consistency and synchronization of tag values.

In U.S. patent application Ser. No. 07/963,885 now U.S. Pat. No. 5,414,841 to Bingham et al., an architecture and general purpose algorithm for the generation of unique tags is disclosed that is infinitely extensible, supports parallel assignments from an arbitrary large number of servers, and assures that uniqueness is maintained. In the Bingham et al architecture, no fixed length fields are required—thus providing a virtually boundless tag domain.

The basic reason for the creation of such an architecture is a need for unique, homogeneous identifiers to tie computer references to real world objects and events together, using a simple symbolic representation that allows easy identification, management and association. An intention of the architecture is to provide a tag that is usable on a worldwide basis by many users—while assuring a globally unique value for each tag.

The unique tag structure 10, as shown in FIG. 1 hereof, is a simple character string or byte array that comprises a sequence of concatenated fields. The tag comprises a delimiter field 12, a version field 14, a variable field 16 and an error checking field 18. Token delimiter field 12 provides a means by which a recognition program can recognize the start of a tag. The delimiter character is a symbol that is relatively uncommon in text; is available in most computer coded character sets; is operating system neutral (avoids sequences such as blanks that are automatically discarded in some computer systems); is visible to the human eye in printable and common character sets; and is common across the universe of connect systems. While there is no character which meets all of these requirements, a preferred symbol is the "<". The delimiter character serves as both a human and a machine readable initial indicator of the beginning of a tag.

Tag version field 14 follows delimiter field 12, identifies a unique token version and is generally a numeric field using values 0–9 across the universe of unique tag values. The value of version field 14 changes very rarely, for example, when the available values in variable field 16 reach a point where it is determined that it is worthwhile to commence a new version—and thus a new series of values in variable field 16.

Variable field 16 includes a string of characters and is unique for a given tag version and thus provides the unique identification for each tag. Both the string of characters in version field 14 and in variable field 16 are virtually unlimited in size. Error field 18 is employed for error checking purposes and may include a standard error check value (e.g. CRC, checksum, parity, etc.).

When utilizing such a tag architecture 10 in a globally accessible tag server, several problems may be encountered. Tag values may often be requested by many clients at the same time, resulting in a long queue of client requests. The length of the queue—and thus the waiting time to receive a response may become quite long. It is clear that any system which results in long waiting times for assignment of tag values will not be long utilized by the clients.

Next, any tag server that is to serve as a center for unique tag values must assure that, under all conditions and for the foreseeable future, all tag values are unique. While such uniqueness can be assured by detailed logging procedures, such logging actions require both substantial computational capability and data recovery speeds that are not compatible with short waiting times for tag assignments.

The tag server must also be able to recover from a system failure almost instantly, with no loss of data integrity and at low cost. This cannot be guaranteed in the case where detailed assignment/user records are used with intermediate processing employed to assure a "hardening" of such data during the assignment process. Hardening of data requires the reading of data values to non-volatile memory, such as one or more disk drives, to assure its availability in the event of a subsequent system failure.

Accordingly, it is an object of this invention to provide an improved tag server system and method that assures little delay to a client requesting service.

It is another object of this invention to provide a tag server system and method wherein logging procedures are minimized during the process of tag assignments.

It is another object of this invention to provide an improved tag server system wherein system recovery in the event of a malfunction is rapid and requires short processing procedures.

It is a further object of this invention to provide an improved tag server which has the capacity to handle multiple client requests for tag assignments while assuring globally unique tag values.

SUMMARY OF THE INVENTION

A tag server system provides unique tag values to many client systems. The tag server system comprises a processor that generates an inventory of unique tag values, such values being generated by monotonically increasing a value within the tag value field. A memory is provided for storing the inventory of unique tag values. A nonvolatile memory is controlled by the processor and stores a highest unique tag value generated by the processor. The processor implements a tag value recovery procedure and is responsive to a data loss failure mode in the tag server system to cause a readout of the highest unique tag value from the non-volatile memory. The processor is responsive to that highest unique tag value to commence generation of new unique tag values monotonically from that value and expends no effort to regenerate lost unique tag values that are less than the highest unique tag value derived from the non-volatile memory.

DETAILED DESCRIPTION OF THE INVENTION

Figure 1:
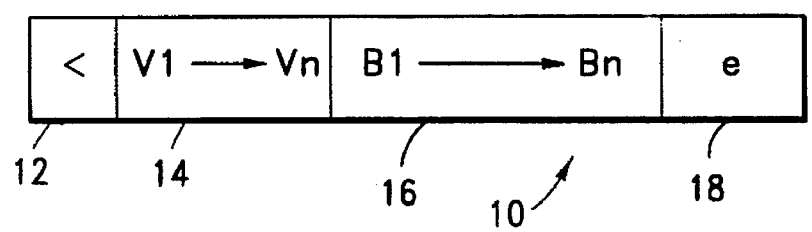
FIG. 1 is a schematic view of a preferred tag architecture.
Figure 2:
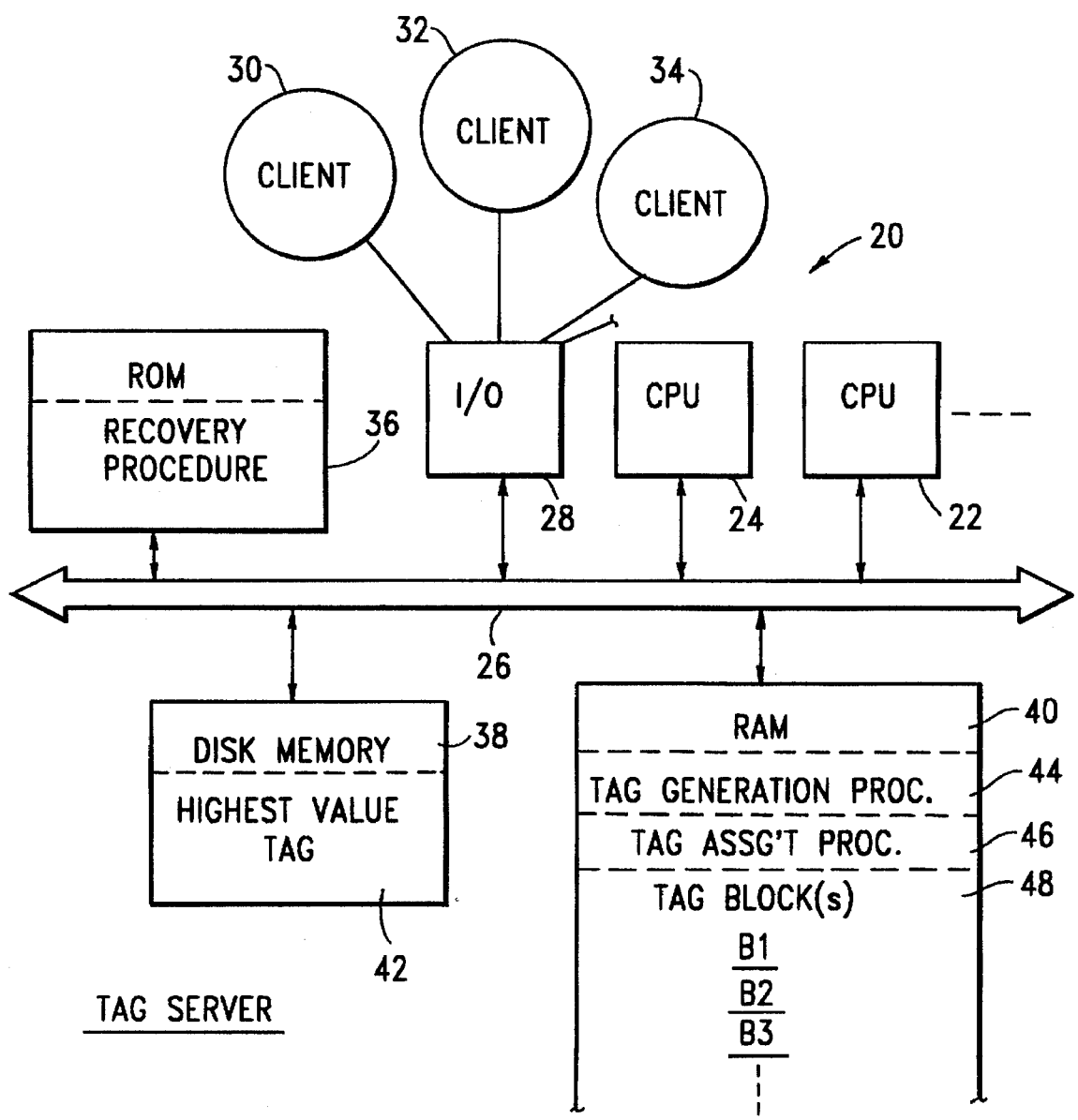
FIG. 2 is a high level block diagram of a data processing system for carrying out the invention hereof.

Referring to FIG. 2, tag server 20 comprises one or more central processing units (CPUs) 22, 24 etc. CPUs 22 and 24 communicate via a bus 26 with remaining subassemblies of tag server 20. An I/O module 28 provides input/output capability for tag server 20 and is connected to plural client systems 30, 32, 34, etc. I/O module 28 communicates with bus 26 as do a read only memory (ROM) 36, a disk memory 38 and a random access memory (RAM) 40. ROM 36 contains, among other subroutines, a recovery procedure that enables tag server 20 to "recover" in the event of a system failure that causes loss of data. Disk memory 38 stores, among other values, a highest assigned tag value 42. Ram 40 stores a procedure 44 that enables CPUs 22 and 24 to generate tag values; a procedure 46 which enables CPUs 22, 24 to assign tag values in response to client requests and blocks 48 of tag values that have been pre-generated.

Tag generation procedure 44 enables one or more CPUs 22, 24 to pre-generate tag values in blocks or batches on a background task basis. Generation of batches of tags is an efficient approach as it reduces total cost and the delay time in responding to a client server request for a tag assignment. The actual size of a block of tag values can be varied depending upon the application. Pre-generation of tag values also allows the generation task to be partitioned among multiple generation tasks that operate simultaneously so as to assure availability of tag values in anticipation of high tag value demands. Memory can also be managed efficiently through the reuse of tag storage blocks after the tag blocks have been assigned and transmitted.

Each time a new tag block is generated, the "high-water mark" tag value is saved immediately. More specifically, the block's highest value tag is "hardened" immediately by storage in disk memory 38 or some other non-volatile memory. Lower tag values are not saved as it is a basic feature of the invention that, upon a failure, all tag values less than the hardened highest tag value are thereafter ignored and a new sequence of tag values generated, starting from the hardened highest tag value. The invention thus assures that tag values will always be unique, but not that they will necessarily be contiguously related.

It is only necessary to save the highest tag value once during a pregeneration of a block of tag values and prior to the use of the tags by the tag assignment procedure. This function may be accomplished asynchronously, with the tag generation procedure continuing in an asynchronous mode and upon demand of a supervisory program to generate blocks of tag values. The process can be implemented as a circular queue or via buffer swapping or another similar scheme.

When tag server 20 receives a request for a tag, tag assignment procedure 46 is invoked and a next available tag or block of tags (depending upon the request) is assigned. A next available tag pointer in the block or (blocks) is then incremented, and I/O module 28 proceeds to transmit the assigned tag values. Tag assignment procedure 46 checks to see if the largest assigned tag value has reached a preset threshold and, if so, it signals tag generation procedure 44 to create a new block (or blocks) of tags. Those tags, or blocks of tags, once generated are queued by tag assignment procedure 46 to await a tag address and a subsequent assignment.

The recovery procedure in ROM 30, as above indicated, enables tag server 20 to recover from a system failure that causes a loss of tag values. Regardless of the status of any blocks of tags generated prior to the failure, the recovery procedure assures that the generation of new tag values resumes with no possible compromise to the uniqueness of tags previously generated. Using the last saved highest tag value 42, tag generation procedure 44 begins generating new tag values without awaiting any other external events. Unused tag values in blocks that were not consumed before a system interruption are lost at restart time. No time or effort is expended trying to ascertain the status of prior tag assignments as those tags were either assigned or are now lost. System priority is assigned to assuring a guaranteed uniqueness of all tags assigned and not that every tag value is sequential. The potential loss of the small number of values from a substantially infinite numbering space is acceptable due to improved system performance and reduced cost.

Figure 3:
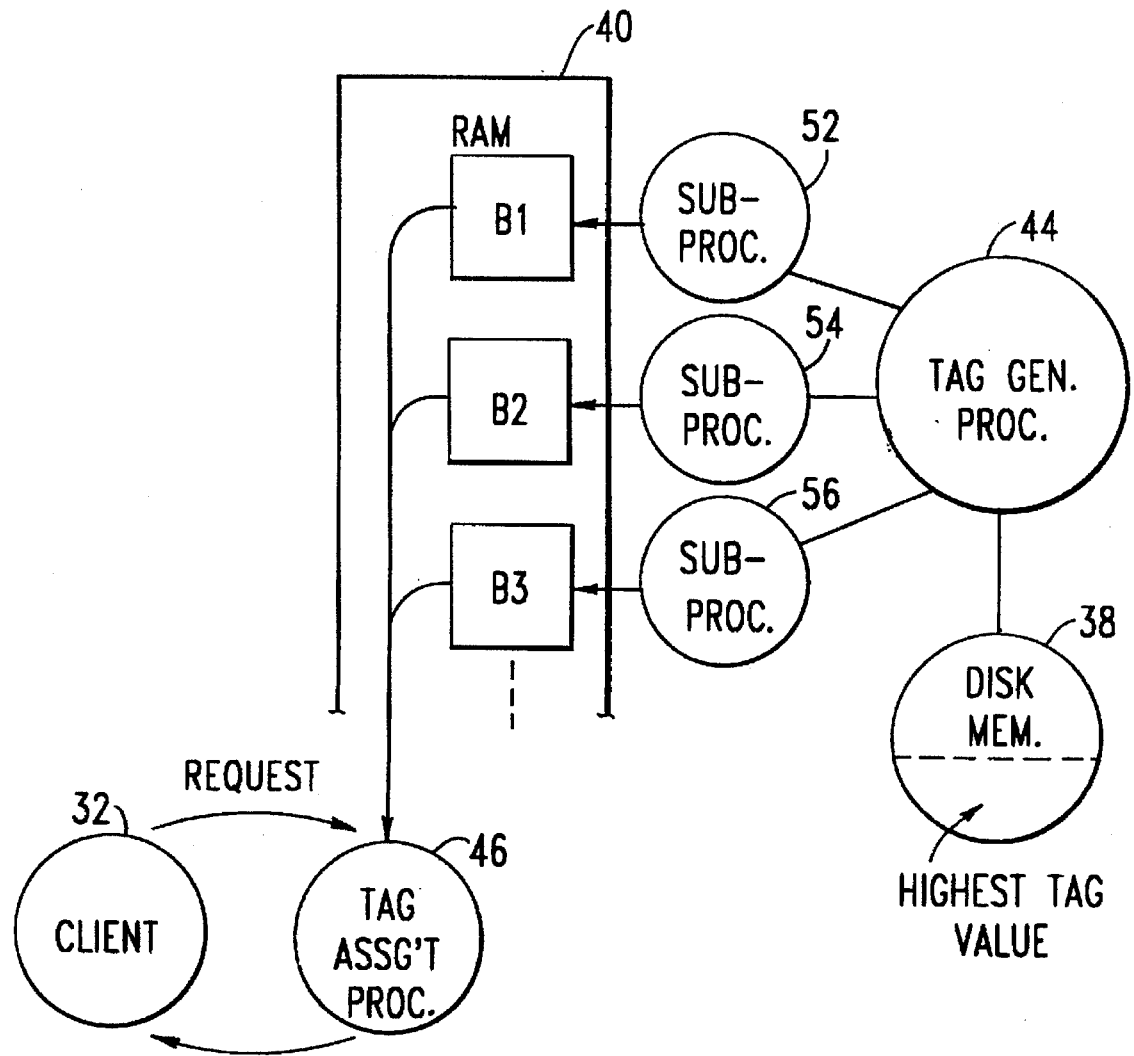
FIG. 3 is a state/system diagram that enables a more detailed understanding of the invention.

Turning to FIG. 3, an example of both tag generation and tag assignment will be described. As indicated above, tag generation procedure 44 may operate in an asynchronous mode and generate tag values in advance of requirement. Tag generation procedure 44 controls a plurality of subprocedures 52, 54, 56, etc. which each generate, in parallel and (potentially) under the control of separate CPUs, a block or blocks of tag values B1, B2, B3, etc. Each of the generated blocks of tag values is stored in RAM 40 to be ready for subsequent assignment. At the same time blocks B1–B3, etc. of tag values are generated, tag generation procedure 44 assures that the highest tag value generated by subprocedures 52, 54, 56 is hardened in disk memory 38.

When a subsequent request is received by tag assignment procedure 46 from a client system 32, tag assignment procedure 46 responds in a manner that is controlled by the number of other requests then in process or anticipated.

For example, tag assignment procedure 46 may transmit to client system 32 an address in RAM 40 wherein requested specific tag values may be found. Using this address, a client system 32 may at some later time, access those values. Until those values are consumed, the areas in RAM containing the values are prevented from being overwritten with new values. Tag assignment procedure 46 may provide the actual tag values to client system 32, if the request is for just few tag values. Alternatively, tag assignment procedure 46 may transmit to client system 32 one or more full blocks of tags on a burst transmission basis if that is deemed to be the most efficient tag value transfer procedure.

In the event of a malfunction that causes a loss of tag values during any point of the procedure prior to receipt at a client system, the highest tag value stored in disk memory 38 is accessed upon system restart and tag generation procedure 44 commences a new tag generation operation from that stored highest tag value.

It should be understood that the foregoing description is only illustrative of the invention. Various alternatives and modifications can be devised by those skilled in the art without departing from the invention. For instance, while concurrently operational tag generation has been described, only a singular tag assignment procedure has been considered. One skilled in the art will realize that the tag assignment procedures may operate concurrently, as well. Accordingly, the present invention is intended to embrace all such alternatives, modifications and variances which fall within the scope of the appended claims.

We claim:

1. A tag server system for providing unique tag values to plural client systems, said tag server system comprising:

processor means for pre-generating a block of unique tag values, said unique tag values generated by increasing a value of a tag body field in said tags;

memory means for storing said block of unique tag values;

non-volatile storage means controlled by said processor means for storing a highest unique tag value of said block generated by said processor means; and tag value recording means responsive to a failure mode in said tag server system that causes a loss of at least some said tag values in said block, for causing a read-out of said highest unique tag value from said non-volatile storage means, said processor means responsive to said highest unique tag value to commence a generation of new block of unique tag values from said read-out highest unique tag value.

2. A tag server system as recited in claim 1 wherein said tag values in said block are generated by monotonically increasing a value in a field in each said tag.

3. The tag server system as recited in claim 2 wherein said processor means causes said non-volatile storage means to store a highest tag value of a block of tag values containing said highest tag value.

4. The tag server system as recited in claim 2 wherein said tag value is monotonically increased as said block of unique tag values are generated, said unique tag values having no predetermined constraint on value, whereby globally unique tag values are guaranteed.

5. The tag server system as recited in claim 2 wherein said processor means comprises plural processors, each said processor generating a pre-assigned range of said monotonically increasing unique tag values.

6. The tag server system as recited in claim 1 wherein said tag server system responds to a request from a client system for a block of unique tag values, by providing to said client system an address that identifies a location in said memory means wherein a block of unique tag values are to be found, whereby said client system may remotely access said block of unique tag values while said tag server responds to a request from yet another client system.

7. The tag server system as recited in claim 1 wherein said tag server system responds to a request from a client system for a block of unique tag values by transmitting to said client server said requested block in a burst mode, whereby message control overhead is minimized.

8. The tag server system as recited in claim 1 wherein each said unique tag value comprises a version field, and a variable field.

9. A method for controlling a tag server to provide unique tag values to plural client systems, said method comprising the steps of:

generating in said tag server a block of unique tag values by increasing a value of a tag body field in said tags;

storing said block of unique tag values;

storing a generated highest unique tag value of said block in non-volatile storage means;

responding to a failure mode in said tag server that causes a loss of at least some said tag values of said block, to cause a read-out of said highest unique tag value of said block from said non-volatile storage means; and commencing a generation of a new block of unique tag values from said read-out highest unique tag value, and expending no effort to generate lost unique tag values that are less than said read-out highest unique tag value.

10. The method as recited in claim 9 wherein said tag values are generated by monotonically increasing a value in a field in each said tag.

11. The method as recited in claim 10 wherein said tag server responds to a request from a client system for a block of unique tag values with the following step:

providing to said client system an address that identifies a location in said memory means wherein a block of unique tag values are to be found, whereby said client system may remotely access said block of unique tag values while said tag server responds to a request from yet another client system.

12. The method recited in claim 10 wherein said tag server system responds to a request from a client system for a block of unique tag values with the following step:

transmitting to said client system said requested block in a burst mode, whereby message control overhead is minimized.

13. The method as recited in claim 12 wherein said tag server system concurrently responds to plural client requests for unique tag values.

14. The method as recited in claim 9 wherein said generating step concurrently generates blocks of unique tag values.

15. A program product in computer readable form for controlling a tag server to provide unique tag values to plural client systems, said tag server comprising memory means for storing tag fields, non volatile memory means and processor means, said program product comprising:

storage means;

means in said storage means for operating said tag server to generate a block of unique tag values by increasing a value of a tag body field in each tag stored in said memory means;

means in said storage means for causing said memory means to store said block of unique tag values;

means in said storage means for causing said nonvolatile memory means to store a generated highest unique tag value of said block;

means in said storage means for causing said processor means to respond to a failure mode in said tag server that causes a loss of at least some said tag values of said block, to cause a read-out of said highest unique tag value of said block from said non-volatile storage means; and means in said storage means for causing said processor means to commence a generation of a new block of unique tag values from said read-out highest unique tag value, and to expend no effort to generate lost unique tag values that are less than said read-out highest unique tag value.

16. The program product as recited in claim 15 wherein said means in said storage means causes said tag values to be generated by monotonically increasing a value in a field in each said tag.

17. The program product as recited in claim 16 further comprising:

means in said program product to cause said tag server to respond to a request from a client system for a block of unique tag values by providing to said client system an address that identifies a location in said memory means wherein a block of unique tag values are to be found, whereby said client system may remotely access said block of unique tag values while said tag server responds to a request from yet another client system.

* * * * *

UNITED STATES PATENT AND TRADEMARK OFFICE
CERTIFICATE OF CORRECTION

PATENT NO. : 5,640,608
DATED : June 17, 1997
INVENTOR(S) : Docketer, et. al.

It is certified that error appears in the above-identified patent and that said Letters Patent is hereby corrected as shown below:

Cancel claim 3 at column 5

Renumber claims 4-17 as claims 3-16, respectively

Columns 6-8:

Claim 10, renumbered as 9, the dependency "9" should be --8--;
Claims 11 and 12, renumber as 10 and 11, the dependency "10" should be --9--;
Claim 13, renumbered as 12, the dependency "12" should be --11--;
Claim 14, renumbered as 13, the dependency "9" should be --8--;
Claim 16, renumbered as 15, the dependency "15" should be --14--; and
Claim 17, renumbered as 9, the dependency "9" should be --15--;

Signed and Sealed this

Second Day of June, 1998

*Attest:*

BRUCE LEHMAN

*Attesting Officer*      *Commissioner of Patents and Trademarks*